United States Patent [19]

Kruglyansky

[11] Patent Number: 5,051,859

[45] Date of Patent: Sep. 24, 1991

[54] CURRENT-LIMITING LOAD CUTOUT

[76] Inventor: Igor M. Kruglyansky, ulitsa Marshala Sokolovskogo, 2, kv. 22, Moscow, U.S.S.R.

[21] Appl. No.: 283,487

[22] Filed: Oct. 24, 1988

[51] Int. Cl.[5] .............................. H02H 3/00

[52] U.S. Cl. .............................. 361/2; 361/7; 361/10; 361/102; 200/144 R

[58] Field of Search .............. 361/87, 93, 2, 102, 361/5, 6, 7, 8, 9, 10, 11, 12, 13; 200/144 R, 148 R

[56] References Cited

U.S. PATENT DOCUMENTS 4,258,345 3/1981 Malick .................. 200/144 R X

FOREIGN PATENT DOCUMENTS 2503929 10/1982 France .
296172 11/1971 U.S.S.R. .
743070 6/1980 U.S.S.R. .
752548 7/1980 U.S.S.R. .

*Primary Examiner*—Derek S. Jennings
*Attorney, Agent, or Firm*—Lillings & Greenspan

[57] ABSTRACT

A current-limiting load cutout includes at least one contact pair (1, 2) with one contact (3, 5) rigidly linked to electrodynamic current limiter (9, 10) that is electrically connected to controllable pulse current supply (17), and at least one emergency state sensor (12, 13, 14) kinematically linked to contact displacement and clamping assembly (11) which is kinematically linked to the other contact (4, 6) of contact pair (1, 2). The current-limiting load cutout is equipped with a pair of power terminals (20, 21, 22, 23) per each contact pair (1, 2) with one power terminal connected to the other contact (4, 6) of the contact pair (1, 2) and the other power terminal connected to contact (3, 5) which is rigidly linked to electrodynamic current limiter (9, 10) equipped with terminal (15, 16) to which a controllable pulse current supply (17) is connected via an emergency state sensor (12).

4 Claims, 2 Drawing Sheets

CURRENT-LIMITING LOAD CUTOUT

BACKGROUND OF THE INVENTION

1. Field of the Invention

The present invention relates to electric engineering, in particular, to circuit breakers and, more specifically, to load cutouts.

2. Description of the Prior Art

The current state of electric engineering is characterized by rapid developments in power convertion engineering. Semiconductor converters, designed with thyristors and diodes, are highly sensitive to overloads and therefore require cutouts featuring very high tripping speed and currentlimiting capability for protection against overloads.

Known in the art is an automatic load cutout (SU, A, 296172) comprising a pair of contacts, one of which is equipped with a contact pressure means and rigidly fitted to an electrodynamic current limiter and electrically connected to it and the second of which is kinematically linked to its displacement and clamping assembly with this assembly kinematically linked to an emergency state sensor, an arc-extinguishing chamber, and two power terminals to accomodate the load. One power terminal is connected to the other contact of the pair of contacts, the other power terminal is electrically connected to the electrodynamic current limiter.

However, the high inertia of the contact displacement and clamping assembly in the known automatic load cutout does not allow the load to be cut out at the moment an emergency state (loverload or short circuit) sets in, this imparing the cutout's current-limiting capability and increasing the tripping time.

Besides this, to open the contacts of the pair of contacts by means of the electrodynamic current limiter the load current has to attain the operating current value at which the contacts open, this also impairing the current-limiting capability and increasing the operate time.

Known in the art is a current-limiting load cutout (FR, B, 8107360) comprising at least one pair of contacts, one contact of which is equipped with a contact pressure means and rigidly linked to an electrodynamic current limiter electrically connected to a controllable pulse current supply, and at least one emergency state sensor kinematically linked to the other contact of the contact pair, a device for extinguishing the arc occuring between the contacts of the contact pair, and a pair of power terminals per each contact pair, with one terminal of the pair electrically connected to the other contact of the contact pair.

The emergency state sensor is connected to one power terminal and to the controllable pulse current supply, the other power terminal being connected to the electrodynamic current limiter and to the controllable pulse current supply.

In the known current-limiting load cutout breaking the contacts of the contact pair, along with the mechanical forces generated by the contact displacement and clamping assembly, is provided by passing a current generated by the controllable pulse current supply through the contact pair and the electrodynamic current limiter.

In the known current-limiting load cutout the electrodynamic current limiter is connected into the load circuit and therefore carries the load current. At a given tripping speed, this results in impaired cost/efficiency due to greater dimensions, metal consumption, energy losses and high cost. Using the emergency state sensor in the switchable load circuit to open the contacts of the contact pair results in a longer tripping time of the contact displacement and clamping assembly due to a low sensitivity of such an emergency state sensor, this further impairing the cost/efficiency.

SUMMARY OF THE INVENTION

This invention resides in the problem of creating a current-limiting load cutout wherein the interconnection of components ensures that only the pulse current will flow through the electrodynamic current limiter.

This objective is attained by a current-limiting load cutout comprising at least one contact pair with one contact equipped with a contact pressure means and rigidly linked to an electrodynamic current limiter electrically connected to a controllable pulse current supply, at least one emergency state sensor kinematically linked to a contact displacement and clamping assembly kinematically linked to the other contact of the contact pair, an arc extinguishing device to extinguish the arc occuring between the contacts of the contact pair, and a power terminal pair per each contact pair with one terminal of the pair electrically connected to the other contact of the contact pair. According to the invention the other power terminal of the power terminal pair is electrically connected to the contact of the contact pair which is rigidly linked to the electrodynamic current limiter, the latter being provided with a terminal to which the controllable pulse current is connected via the emergency state sensor.

It is expedient to electrically insulate the electrodynamic current limiter from the contact of the contact pair connected electrically to the other power terminal of the power terminal pair and to supplement the electrodynamic current limiter with a terminal to accomodate the controllable pulse current supply.

In case a group of emergency state sensors are employed, it is expedient to connect the controllable pulse current supply via one of the emergency state sensors and connect the other emergency state sensors each to its respective power terminal of the power terminal pair, which is connected either to the other contact of the contact pair, and to the controllable pulse current supply, or to the respective power terminal of the power terminal pair, which is connected to the other contact of the contact pair.

The current-limiting load cutout of the invention features essentially reduced dimensions of the load cutout, and also essentially reduced operational power losses, due to the electrodynamic current limiter being removed out of the switchable circuit and passing only a pulse current from the controllable pulse current supply. Inclusion of the emergency state sensor into the controllable pulse current supply circuit enables the use of sensors designed to operate rated currents and featuring higher sensitivities.

BRIEF DESCRIPTION OF DRAWINGS

The invention is hereafter described with reference to specific embodiments thereof and accompaying drawings wherein.

DESCRIPTION OF THE PREFERRED EMBODIMENTS

Figure 1:
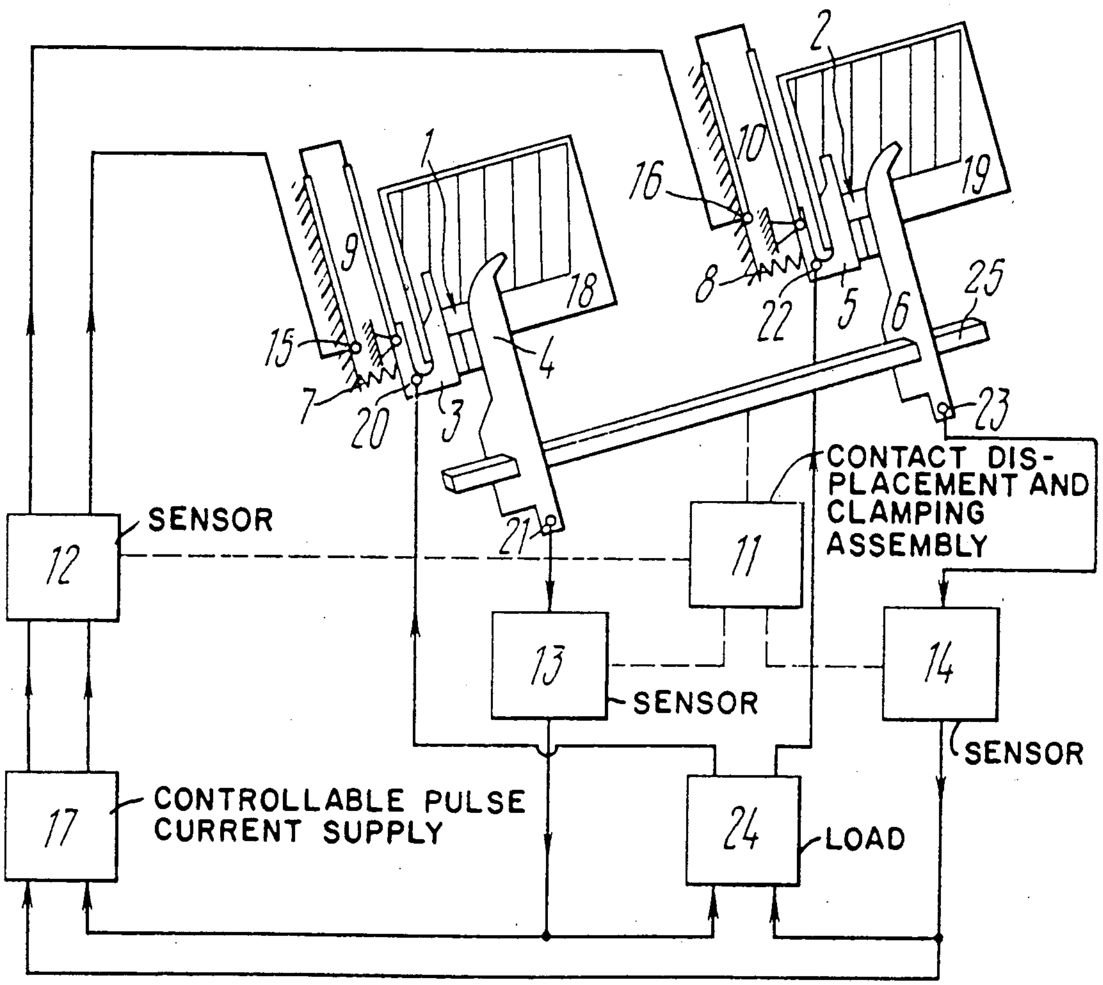
FIG. 1 shows in schematic form a current-limiting load cutout according to the invention.

The current-limiting load cutout comprises at least one pair of contacts, in the embodiment under discussion—two contact pairs 1, 2 (FIG. 1) with contacts 3, 4 and 5, 6, respectively. Each of the 3, 5 contacts is equipped with a contact pressing means 7, 8 (in the embodiment being described—a spring) and is rigidly linked to an electrodynamic current limiter 9, 10, respectively. The other contacts 4, 6 of the corresponding contact pairs 1, 2 are kinematically linked to contact displacement and clamping assembly 11 (this kinematic link with contacts 4, 6 is shown by a dashed line in the Figure). Contact displacement and clamping assembly 11 may be, e.g., a mechanical system of springs and articulated arms designed to close and open contacts 3, 4 and 5, 6 of contact pairs 1, 2. Contact displacement and clamping assembly 11 is kinematically linked (the kinematic link is shown schematically by a dashed line) to at least on emergency state sensor, in the present embodiment-to three emergency state sensor, 12, 13, 14, implemented, e.g., with electromagnetic release devices.

Electromagnetic current limiters 9, 10 are equipped with terminals 15, 16 to connect controllable pulse current supply 17 via emergency state sensor 12, this controllable pulse current supply may be embodied, e.g., in the form of a capacitor and thyristor connected in series. The currentlimiting load cutout contains (one per each contact pair 1, 2) devices 18, 19 for extinguishing arcs occuring between contacts 3, 4 and 5, 6 of contact pairs 1, 2, respectively, and power terminal pairs 20, 21 and 22, 23 to accomodate the load 24. Power terminals 20, 22 are connected to contact pairs 1, 2 contacts 3, 5, which are rigidly linked to electromagnetic current limiters 9, 10, and the other power terminals 21, 23 are connected to contacts 4, 6 of contact pairs 1, 2. When a group of emergency state sensors 12, 13, 14 is used power terminals 21, 23 are connected to emergency state sensors 13, 14, which are connected to controllable pulse current supply 17. Contacts 4, 6 are fitted to a common cross-piece.

Figure 2:
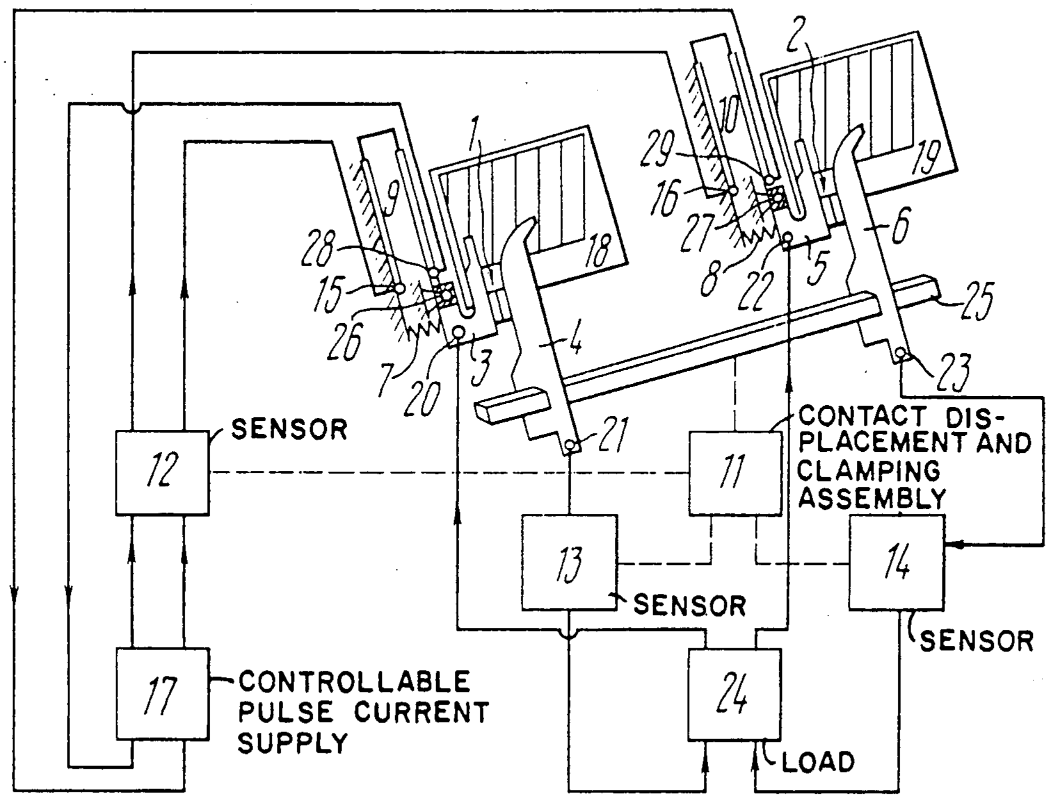
FIG. 2 illustrates the current-limiting load cutout of FIG. 1 wherein the electrodynamic current limiter is, according to the invention, electrically insulated from the contact pair.

In the current-limiting load cutout shown in FIG. 2 the electrodynamic current limiters 9, 10 are electrically insulated with the aid of insulators 26, 27 (e.g., plates of cloth-based laminate) from rigidly affixed to them contacts 3, 5 of contact pairs 1, 2 and are provided with supplementary terminals 28, 29 designed to accomodate the controllable pulse current supply 17.

In this embodiment of the current-limiting load cutout emergency state sensors 13, 14 are connected to contacts 4, 6 of contact pairs 1, 2 and controllable pulse current supply 17 has no direct electric connection with these contacts.

In both embodiment load 24 is connected to power terminals 21, 23 via emergency state sensors 13, 14.

The current-limiting load cutout operates as follows.

At the moment of onset of an emergency state (overload, short circuit) in load 24 (FIG. 1) a pulse is generated in the controllable pulse current supply 17 with current flowing along the following path by arrows in the Figures: emergency state sensor 12—terminals 15, 16 of electrodynamic current limiter 9, 10—electrodynamic current limiters 9, 10—contacts 3, 4 and 5, 6 of contact pairs 1, 2—power terminals 21, 23 of terminal pairs 20, 21 and 22, 23—emergency state sensors 13, 14—controllable pulse current supply 17. The current pulse passing through electrodynamic current limiters 9, 10 generates electrodynamic forces which repel contacts 3, 5 rigidly linked to their respective current limiters 9, 10. When the gap between contacts 3 and 4 and between contacts 5 and 6 attains a certain width electric arcs are developed and are removed into respective devices 18, 19 for extinction. The voltage drops across the arcs between contacts 3 and 4 and between contacts 5 and 6 appear in load 24 circuit comprising power terminals 20, 22, contact pairs 1, 2, power terminals 21, 23, and emergency state sensors 13, 14. These voltage drops limit the current flowing through load 24 and cause a break of this circuit. After the pulse current stops flowing the electrodynamic forces affecting contacts 3, 5 drop off and these contacts begin to move in the reverse direction under the action of contact pressure means 7, 8, tending to close with contacts 4, 6.

The pulse amplitude and duration are selected so as to enable contact displacement and clamping assembly 11 to trip and contacts 4, 6 to begin moving before repelled contacts 3, 5 return to their initial position.

The current pulse facilitates contact displacement and clamping assembly tripping by passing through emergency state sensor 12 connected between the pulse current supply 17 and electrodynamic current limiters 9, 10.

In general, the current-limiting load cutout shown in FIG. 2 functions as described above. In the presence of electric insulators 26, 27 (FIG. 2) the pulse current at the moment of emergency state onset flows along the following path: emergency state sensor 12-terminals 15, 16 of electrodynamic current limiters 9, 10-electrodynamic current limiters 9, 10—terminals 28, 29 of current limiters 9, 10—controllable pulse current supply 17.

Load 24 is cut out in the same sequence as described above.

The presence of electric insulation of electrodynamic current limiters 9, 10 from contacts 3, 5 of contact pairs 1, 2 allows electrodynamic current limiters 9, 10 to be connected in series, this essentially simplifying the design of controllable pulse current supply 17.

The described components arrangement wherein electrodynamic current limiters 9, 10 carry only pulse currents and inclusion in the circuitry of a high-sensitivity emergency state sensor 12 allow, at a specified tripping time, to essentially reduce the overall dimensions and metal consumption of a current-limiting load cutout, and also power losses related to its operation.

The invention may be successfully used to protect critical to overloads users, specifically-thyristor converters.

We claim:

1. A current-limiting cutout comprising at least one contact pair (1,2) having a pair of contacts (3,4;5,6); an electrodynamic current limiter (9,10) having a terminal (15,16), one contact (3,5) being linked to said electrodynamic current limiter; biassing means for normally pressing the contacts of each contact pair into abutting contact against each other; a controllable pulse current supply (17) electrically connected to said electrodynamic current limiter (9,10); at least one emergency state sensor (12,13,14); a contact displacement and clamping assembly (11) kinematically linked to said at least one emergency state sensor (12,13,14), said contact displacement and clamping assembly (11) also being kinematically linked to the other contact (4,6) of said at least one contact pair (1,2); a device (18,19) for extinguishing arcs arising between contacts (3,4,5,6), each contact pair (1,2) having a pair of power terminals (20,21; 22,23) with one terminal (20,21) connected to said other contact (4,6) and the other power terminal (20,22) being connected to said one contact (3,5), said terminal (15,16) of said electrodynamic current limiter being connected to said controllable pulse current supply (17) by way of said at least one emergency state sensor (12,13,14).

2. The current-limiting load cutout of claim 1, wherein said electrodynamic current limiter (9,10) is electrically insulated from said one contact (3,5) to which said other power terminal (20,22) is connected, said electrodynamic current limiter (9,10) being provided with an additional terminal (28,29) for connecting said controllable pulse current supply (17).

3. The current-limiting load cutout of claims 1 or 5, wherein a group of emergency state sensors (12,13,14) are provided one of which is connected to said terminal (15,16) of said electrodynamic current limiter (9,10) via said controllable pulse current supply (17) and the other emergency state sensors (13,14) are each connected either to its respective power terminal (21,23), which is connected to said other contact (4,6) and to said controllable pulse current supply (17) or to said respective power terminal (21,23) that is connected to said other contact (4,6).

4. A current-limiting load cutout of claim 1, wherein said biassing means comprises a compression spring.

* * * * *